F. A. LEWIS.
WATER TRAP OR STRAINER.
APPLICATION FILED SEPT. 11, 1908.
916,340.
Patented Mar. 23, 1909.
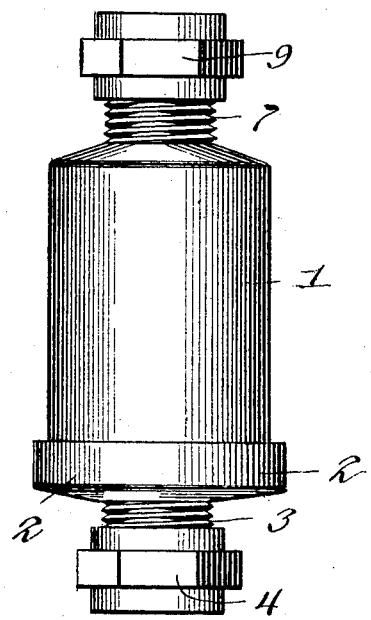
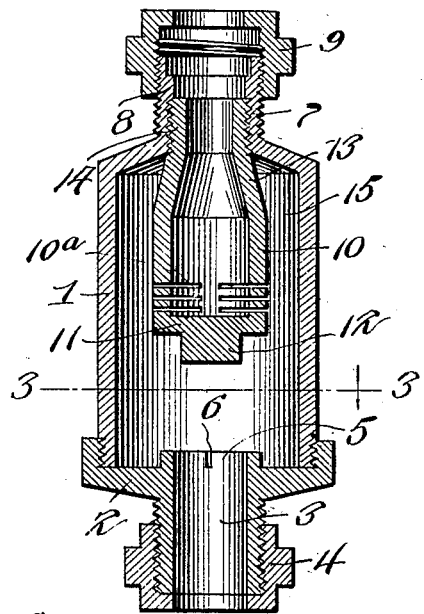

UNITED STATES PATENT OFFICE.

FREDERICK A. LEWIS, OF WICHITA, KANSAS.

WATER TRAP OR STRAINER.

No. 916,340.  Specification of Letters Patent.  Patented March 23, 1909.

Application filed September 11, 1908. Serial No. 452,616.

*To all whom it may concern:*

Be it known that I, FREDERICK A. LEWIS, a citizen of the United States, residing at Wichita, in the county of Sedgwick and State of Kansas, have invented new and useful Improvements in Water Traps or Strainers, of which the following is a specification.

This invention relates to a water trap or strainer designed for use in water supply pipes adjacent to fixtures for the purpose of catching and retaining foreign substances, such as gravel, pipe thread shavings and other impurities liable to get into faucets and valves and prevent their tight closing.

The object of the invention is to provide a simple and effective device of this character which will operate without clogging, from which the water will drain when the flow is cut off at an adjacent stop cock so as to prevent freezing of the water therein, from which the impurities may be conveniently removed at desired intervals, and which is so constructed as to prevent water hammer and the objectionable noises arising therefrom.

The invention consists of the features of construction, combination and arrangement of parts hereinafter fully described and claimed, reference being had to the accompanying drawing, in which:—

Figure 1 is a side elevation of a water trap or strainer embodying my invention. Fig. 2 is a central vertical longitudinal section of the same. Fig. 3 is a horizontal transverse section on line 3—3 of Fig. 2.

Referring to the drawing, my improved water trap or strainer comprises an outer shell or casing 1 closed at its lower end by an internally threaded flanged cap or cover 2 provided with an externally threaded nipple 3, forming the water inlet of the trap. A coupling nut or union 4 engages the nipple 3 and is adapted to connect the same with one of the proximate ends of the water supply pipe. The cap or cover 3 is preferably provided with a short flange 5 extending a short distance into the bottom of the casing and forming a guard around the top of the inlet to form a surrounding catch basin to retain the impurities deposited upon said cap. Notches 6 are formed in this flange at equal distances apart to permit the water in the catch basin to flow outward when the trap is drained.

The upper end of the shell or casing 1 is contracted and provided with a tubular extension or nipple 7 having a central internal annular shoulder 8 and provided with external screw threads for the reception of an adjustable coupling nut or union 9 for connecting said nipple with the other proximate end of the water supply pipe or the adjacent fixture. Below the shoulder 8 the nipple 7 is internally threaded to receive the upper cylindrical externally threaded end of an inner shell or trap 10, which bears against said shoulder when fully inserted in position. The body portion of the inner shell or trap 10 is cylindrical and closed at its lower end by a head 11 having an angular projection 12 for the application of a wrench in applying and removing it, while the upper portion of said trap is tapering or conical, as shown at 13, between said body portion and the upper externally threaded end 14, which latter forms the outlet for the discharge of the clear water passing through the trap into the outer end of the nipple 7.

The lower portion of the body of the inner trap or shell, which latter terminates at a suitable elevation above the bottom of the outer shell, is provided with opposite sets or series of inlet slots $10^a$. These slots are arranged in vertical series at diametrically opposite sides and are of segmental form to extend partially around the inner shell, and are of such restricted width as to prevent the entrance into said inner trap of a greater proportion of the solid impurities flowing with the water. It is preferred to make these slots or inlets in the nature of saw cuts, as the slots may thus be made of some considerable circumferential length but of restricted width to allow of the free passage of water while preventing passage of the impurities of sufficient size to injure the valves or fittings in the system, and at the same time slots of this character are less liable to be clogged by the impurities than ordinary perforations of any other form or kind.

It will be observed that the inner shell or trap depends but a part way into the outer shell from the top thereof, and is concentrically arranged therein, thus leaving an internal annular intervening space 15. This space forms an air chamber in which the air contained in the bottom of the trap passes under the pressure of the entering water and is compressed to form an air cushion. The formation of this cushion prevents the agitation of the water ordinarily called hammering, thus rendering the trap practically noiseless in operation.

In practice, the trap is arranged between the proximate ends of a water supply pipe adjacent to the fixture to be protected, or between an end of the pipe and the fixture, and the water entering through the inlet 3 rises in the trap until it passes just above the upper series of slots 10ª and compresses the air in the chamber 15. The water within the outer shell, under ordinary service pressure, thence passes through the slots 10ª into the inner trap or shell 10, and thence discharges in its strained or purified condition through the outlet nipple 7. As the slots 10ª are too small for the passage of all solid impurities of any material size, it will be understood that the impurities will be retained within the outer trap or shell 1 and will gravitate downward and rest upon the bottom cap 2 around the guard 5, and that these impurities may be removed at desired intervals, after cutting off the flow of water through the pipe, by simply removing the cap 2. When the flow of water is cut off by a stop valve or cock during cold weather to drain the water pipe, the water will also drain out of the trap, as will be readily understood, any small amount of water occupying the lower portion of the outer shell around the guard discharging through the slots 6. Hence, as soon as the pipe is drained of its contents, the water in the trap will also drain off to prevent freezing of the same at low temperature.

Having thus fully described the invention, what is claimed as new is:—

1. A water trap or strainer comprising an outer shell normally open at its lower end and having an outlet at its upper end, a detachable lower head closing said open end and having a water inlet passage, and an inner shell within the upper portion of the outer shell provided at its upper end with an outlet portion threaded into the outlet of the outer shell, said inner shell being insertible and withdrawable through the opening closed by the lower head and provided at its lower end with a depending wrench engaging surface and above the same with opposed series of horizontal segmental slots arranged opposite each other.

2. A water trap or strainer comprising an outer shell normally open at its lower end and having a reduced threaded outlet at its upper end and provided with a detachable lower head closing said open end and having a water inlet passage and an annular guard extending above said passage and provided with slots or perforations, and an inner shell within the upper portion of the outer shell provided at its upper end with an outlet threaded into the outlet of the outer shell and at its lower end with a wrench head and a series of restricted inlets, said inner shell being insertible and withdrawable through said open end of the outer shell when the head is detached, and arranged to form within the upper portion of the outer shell an air cushioning chamber.

In testimony whereof I affix my signature in presence of two witnesses.

FREDERICK A. LEWIS.

Witnesses:
ADELBERT D. LEWIS,
CHARLES C. BISHOP.